Dec. 25, 1962 H. M. RUSH 3,069,766
METHOD OF BRAZING METALS
Filed April 4, 1958
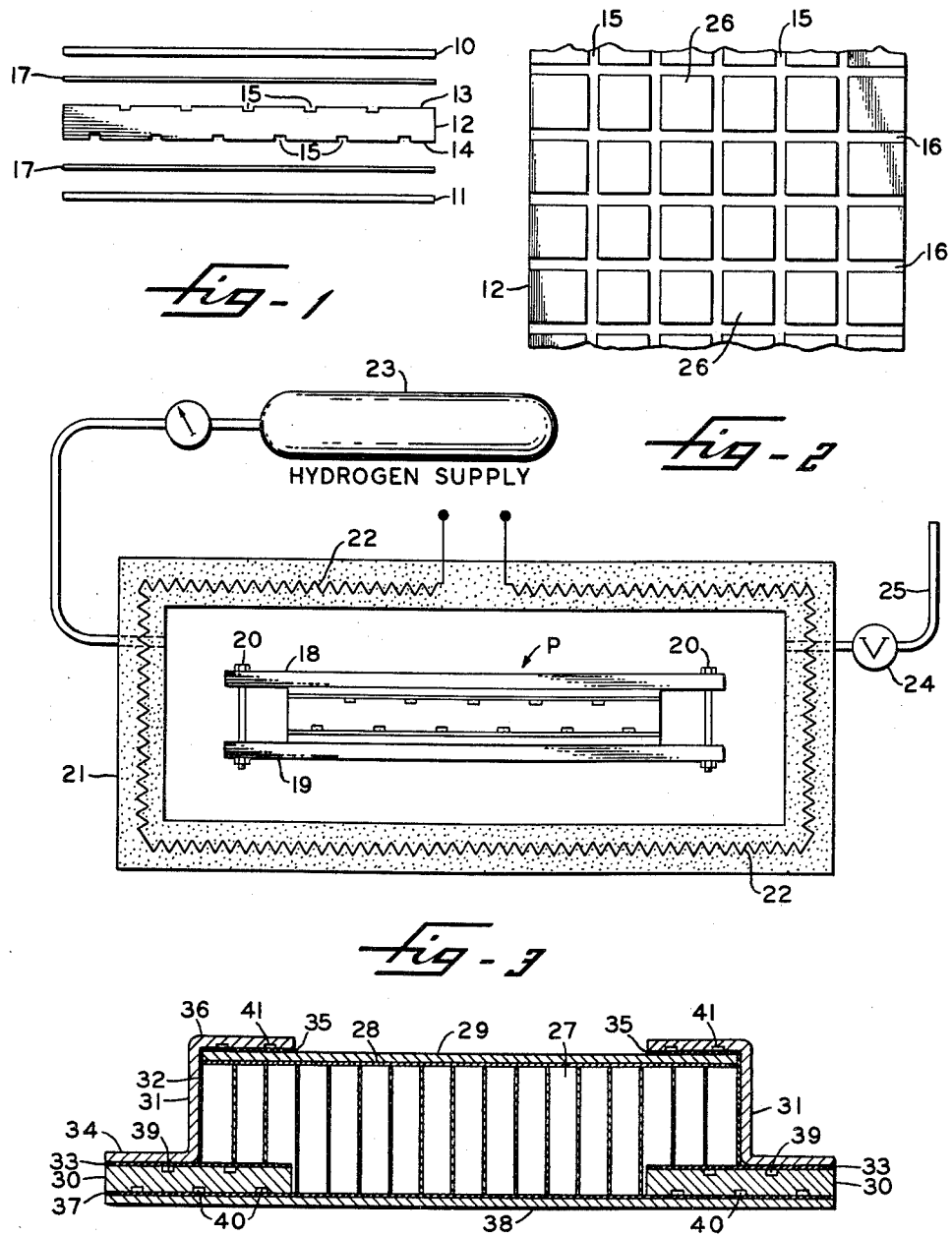
INVENTOR.
H.M.RUSH
BY S. Tierney, Jr.
ATTORNEY 3,069,766
METHOD OF BRAZING METALS
Hugh M. Rush, Coronado, Calif., assignor to Rohr Aircraft Corporation, Chula Vista, Calif., a corporation of California
Filed Apr. 4, 1958, Ser. No. 726,369
3 Claims. (Cl. 29—488)

When two metal members are to be brazed together, especially where their faying surfaces are of large area, I have found that one or more small air bubbles are trapped between the faying surfaces which prevent the brazing metal from becoming attached in those areas thus weakening the brazed joint. I have also found that if pressure is applied to the members to secure close contact between the faying surfaces, the entrapped air bubbles are not forced out but merely become thinner with a resulting corresponding increase in area so that still larger areas of the faying surfaces remain out of contact during the brazing. The application of high pressure is not, therefore, of material benefit in producing a strong brazed joint under these conditions.

A main object of my invention is to provide means for permitting any gas bubbles or pockets between the faying surfaces to escape and thus permit the braze metal when molten to become attached to the entire faying surfaces of the brazed members.

Another object is to provide for the escape of such entrapped gas by making a plurality of shallow grooves in one or both of the faying surfaces, the grooves extending clear to the edge of the member. Such grooves are preferably made in two sets, the grooves of the first set terminating in two opposite edges of the member while those of the second set intersect those of the first set and terminate in the other edges of the member.

A further object is to provide a method whereby all such required grooves can be made simultaneously and at low cost by chemical etching of the metal.

Further objects will become apparent as a description of the brazing process proceeds. For a better understanding of the invention, reference is made to the accompanying drawing, in which:

FIGURE 1 is an exploded view of a plurality of metal members ready for brazing;

FIGURE 2 is a top view of the central or core member of FIGURE 1;

FIGURE 3 is a schematic view of a furnace and a press holding the members of FIGURE 1 together during the brazing operation, and;

FIGURE 4 is a sectional view of a metal honeycomb panel showing the component members assembled for brazing.

FIGURES 1 to 3 illustrate a s simple embodiment of the invention in which it is desired to braze upper and lower rectangular metal sheets 10, 11 to a central metal plate or core 12. Sheets 10 and 11 may be of stainless steel, for example, and of large area such as several square feet while plate 12 may be of mild steel. Plate 12 is entirely covered with masking material except for a plurality of small intersecting stripes on its upper and lower faces 13, 14, this masking material being insoluble in the acid etchant used. This masking may be easily done by spraying on a liquid plastic which hardens on standing, a suitably shaped stencil or stencils being used to cover those portions of faces 13, 14 to be etched. The masked plate is then immersed in an acid etchant solution in which the steel is soluble until shallow grooves are formed, preferably to a depth of from .0015 to .0025 inch and each groove is preferably from .020 to .030 inch wide. As shown in FIGURE 2 all the grooves extend to the edges of the plate and the longitudinal grooves 15 intersect the transverse grooves 16. While the two sets of grooves are shown at right angles to each other, this is not necessary as they may intersect at various acute angles. Also it is not necessary that the grooves be straight as they may be of many different curved configurations (not shown). I have found that a spacing between adjacent grooves of from ¼ to ½ inch is suitable. The grooves in face 14 are preferably staggered with those in upper face 13, as shown. After the grooves are etched, plate 12 is removed from the etchant, rinsed in water, the masking removed from it and the plate washed and dried.

Thin sheets 17 of brazing metal are placed between sheets 10, 11 and plate 12. In the example given, sheets 17 may be approximately .002 inch thick and made of an alloy composed of 85 percent silver and 15 percent manganese. The assembled sheets are then placed in a press P having upper and lower rigid metal plates 18, 19 adapted to be drawn together by bolts 20. After tightening the bolts, the assembly is placed in an electric furnace 21 having a heater element 22 embedded in its walls. A supply of dry hydrogen or argon from a supply tank 23 is then introduced into the furnace the air escaping through a check valve 24 and pipe 25. After removal of the air, current is supplied to heater 22 and the temperature raised to melt the brazing alloy and braze sheets 10 and 11 to plate 12. Any bubbles of air or gas entrapped between plate 12 and sheets 10, 11 while tightening bolts 20 or during the braze heating pass along one or more of the grooves 15, 16 and escape at an edge of plate 12.

When a brazed assembly was cut open it was found that a substantial amount of the molten braze alloy had flowed into grooves 15, 16 to provide, upon hardening, masses of braze metal which unite the members in addition to those areas of braze metal which cover the rectangular areas 26 lying between the grooves. Instead of making the grooves in plate 12, this plate may be left plane and a set of intersecting grooves may be etched into the bottom face of sheet 10 and a similar set of grooves in the top of sheet 11 using the masking and etching process above described.

While the process has been described in connection with the brazing of members composed of ferrous alloys, it will be understood that it can also be used for brazing different non-ferrous alloys together, the composition of the braze alloy sheets 17 in each case being compatible with that of the members being brazed.

FIGURE 4 shows an application of the invention for making a honeycomb panel comprising a honeycomb core 27 having vertical cell walls the tops of which are covered by a strip 28 of brazing alloy in contact with a top cover skin or sheet 29. The bottom of core 27 is undercut all around its edge to receive a doubler 30 which extends a substantial distance beyond the outer face of core 27. Extending entirely around core 27 is a closure member 31 illustrated as being of Z shape although it could be of U or other desired shape. A thin strip 32 of braze alloy is interposed between the outer face of core 27 and member 31, a strip 33 of braze alloy is between the lower horizontal limb 34 of member 31 and the top of doubler 30 and a strip 35 of braze alloy is between the upper horizontal limb 36 of member 31 and skin 29. A strip 37 of braze alloy contacts the bottom of doubler 30 and core 27 and the top face of a bottom closure sheet or skin 38. Prior to assembly both faces of doubler 30 have etched therein in the manner above described sets of intersecting shallow grooves 39, 40 which extend to the outer face of the doubler to permit the escape of any entrapped air. Sets of intersecting grooves 41 are also etched in the bottom face of horizontal limb 36.

The component parts of the panel can be electrically tack welded together to hold them in the assembled relation shown, placed in a brazing furnace and brazed in an inert gas. When the component members including core 27 are of stainless steel and the strips of brazing alloy are of the above noted composition, a brazing temperature in the furnace of about 1800° F. is effective in securing the component parts of the panel together by strong joints.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. The method of brazing two thin metal sheets to the opposite faces of a metal plate which comprises the steps of etching sets of narrow shallow intersecting grooves in said faces and staggering the grooves of one set with respect to the grooves of the other, the grooves in each face extending to the edge thereof and having a width of from .020 to .030 inch and a depth of from .0015 to .0025 inch; covering said grooved faces with thin layers of brazing alloy; and pressing said metal sheets against said alloy layers while simultaneously heating said sheets and plate to the melting point of the brazing alloy; and passing any gas entrapped between said faces and sheets through and along said grooves and outwardly of said plate and sheets.

2. The method of brazing the faying surfaces of two sheet metal members together which comprises the steps of etching in at least one of the surfaces a set of intersecting shallow grooves which extend to the outer edge of said one surface and have a width of from .020 to 0.30 inch and a depth of from .0015 to .0025 inch; covering said grooved surface with a thin layer of brazing alloy; pressing the other of said faying surfaces against said alloy layer and simultaneously heating said members to the melting point of the brazing alloy; and passing any gas entrapped by the melted alloy between said faying surfaces through and along said grooves and outwardly of said members.

3. The method as in claim 2 and comprising the additional steps of placing the pressed members and alloy layer in an enclosed furnace; removing the air from said furnace and concurrently replacing the same with hydrogen or argon gas from a source under pressure, said gas and any air remaining between said faying surfaces passing outwardly of said grooves on heating said members and alloy; and heating said furnace to melting temperature of said alloy, said melted alloy flowing into said grooves to increase the bonded area between said members.

References Cited in the file of this patent
UNITED STATES PATENTS

| | | |
|---|---|---|
| 1,644,741 | Mougey | Oct. 11, 1927 |
| 1,857,929 | McFarland | May 10, 1932 |
| 2,274,550 | Karmazin | Feb. 24, 1942 |
| 2,298,999 | Allen | Oct. 13, 1942 |
| 2,384,157 | Burke | Sept. 4, 1945 |
| 2,414,463 | Gunn et al. | Jan. 21, 1947 |
| 2,424,522 | Wasserman | July 22, 1947 |
| 2,454,244 | Wintermute | Nov. 16, 1948 |
| 2,713,196 | Brown | July 19, 1955 |
| 2,778,458 | Briggs | Jan. 22, 1957 |
| 2,832,570 | Schoessow | Apr. 29, 1958 |
| 2,926,761 | Herbert | Mar. 1, 1960 |
| 2,934,820 | Novak et al. | May 3, 1960 |
| 2,944,504 | Herman et al. | July 12, 1960 |
| 3,012,317 | Wolfe | Dec. 12, 1961 |